(12) United States Patent
He et al.

(10) Patent No.: US 9,934,312 B2
(45) Date of Patent: Apr. 3, 2018

(54) RECOMMENDATION SEARCH METHOD FOR SEARCH ENGINE, DEVICE AND COMPUTER READABLE STORAGE MEDIUM

(71) Applicant: SHENZHEN SHI JI GUANG SU INFORMATION TECHNOLOGY CO., LTD., Shenzhen (CN)

(72) Inventors: Jun He, Shenzhen (CN); Jianfeng Kuang, Shenzhen (CN); Huajie Pan, Shenzhen (CN)

(73) Assignee: SHENZHEN SHI JI GUANG SU INFORMATION TECHNOLOGY CO., LTD., Shenzhen (CN)

( * ) Notice: Subject to any disclaimer, the term of this patent is extended or adjusted under 35 U.S.C. 154(b) by 819 days.

(21) Appl. No.: 14/497,993

(22) Filed: Sep. 26, 2014

(65) Prior Publication Data
US 2015/0012519 A1    Jan. 8, 2015

Related U.S. Application Data

(63) Continuation of application No. PCT/CN2013/073129, filed on Mar. 25, 2013.

(30) Foreign Application Priority Data

Mar. 26, 2012   (CN) .......................... 2012 1 0081897

(51) Int. Cl.
*G06F 7/00*        (2006.01)
*G06F 17/30*       (2006.01)

(52) U.S. Cl.
CPC .... *G06F 17/30864* (2013.01); *G06F 17/3064* (2013.01); *G06F 17/3097* (2013.01); *G06F 17/30867* (2013.01)

(58) Field of Classification Search
CPC .......................... G06F 17/30864; G06F 17/30
(Continued)

(56) References Cited

U.S. PATENT DOCUMENTS

| 8,504,437 | B1 * | 8/2013 | Agarwal | ................. G06F 17/30 |
|---|---|---|---|---|
| | | | | 705/14.54 |
| 9,031,970 | B1 * | 5/2015 | Das | ....................... G06F 17/276 |
| | | | | 707/706 |

(Continued)

*Primary Examiner* — Binh V Ho
(74) *Attorney, Agent, or Firm* — Anova Law Group, PLLC

(57) ABSTRACT

A recommendation search method is provided for a search engine. The method includes recording a search log and a click log for query terms during search processes, and determining weights of tendencies of vertical searches for the query terms based on the recorded search log and click log. The method also includes, upon detecting a query term in a search box, determining recommended query terms relating to the query term in the search box, searching for the weights of tendencies of the vertical searches for each of the recommended query terms and determining a tendentious vertical search type for each of the recommended query terms based on the weights of tendencies of the vertical searches, and displaying each of the recommended query terms and links of the tendentious vertical search types for the recommended query terms. Further, the method includes, upon detecting a click on a link of one of the tendentious vertical search types corresponding to one of the recommended query terms, performing a search based on the one of the recommended query terms by using a vertical search engine corresponding to the one of the tendentious vertical search type, and displaying search results.

17 Claims, 4 Drawing Sheets

(58) Field of Classification Search
USPC .......................................................... 707/706
See application file for complete search history.

(56) References Cited

U.S. PATENT DOCUMENTS

| | | | | |
|---|---|---|---|---|
| 9,317,605 | B1* | 4/2016 | Zivkovic | G06F 17/3097 |
| 2005/0234879 | A1* | 10/2005 | Zeng | G06F 17/3064 |
| 2007/0130126 | A1* | 6/2007 | Lucovsky | G06F 17/30864 |
| 2008/0162437 | A1* | 7/2008 | Choi | G06F 17/30265 |
| 2009/0083226 | A1* | 3/2009 | Kawale | G06F 17/30864 |
| 2009/0094221 | A1* | 4/2009 | Cameron | G06F 17/3064 |
| 2009/0119259 | A1* | 5/2009 | Williams | G06F 17/30867 |
| 2010/0082649 | A1* | 4/2010 | Gutt | G06F 17/30864 707/758 |
| 2010/0153384 | A1* | 6/2010 | van Zwol | G06F 17/30648 707/726 |
| 2010/0250524 | A1* | 9/2010 | Hu | G06F 17/30675 707/723 |
| 2011/0055189 | A1* | 3/2011 | Effrat | G06F 17/3064 707/706 |
| 2011/0082649 | A1* | 4/2011 | Riti | G01N 21/3504 702/28 |
| 2011/0314419 | A1* | 12/2011 | Dunn | G06F 17/30905 715/810 |
| 2011/0320437 | A1* | 12/2011 | Kim | G06F 17/3089 707/722 |
| 2011/0320440 | A1* | 12/2011 | McDonald | G06F 17/3089 707/723 |
| 2014/0201181 | A1* | 7/2014 | Agarwal | G06F 17/2247 707/706 |

\* cited by examiner

RECOMMENDATION SEARCH METHOD FOR SEARCH ENGINE, DEVICE AND COMPUTER READABLE STORAGE MEDIUM

CROSS-REFERENCE TO RELATED APPLICATIONS

This application is a Continuation Application of PCT Application No. PCT/CN2013/073129, entitled "RECOMMENDATION SEARCH METHOD FOR SEARCH ENGINE, DEVICE AND COMPUTER READABLE STORAGE MEDIUM" and filed on Mar. 25, 2013, which claims priority to Chinese Patent Application No. 201210081897.6, filed on Mar. 26, 2012, entire contents of both of which are incorporated by reference in their entireties.

TECHNICAL FIELD

The present disclosure relates to Internet information search technology, in particular to a recommendation search method for a search engine, an apparatus and a computer-readable storage medium.

BACKGROUND

An Internet search engine uses particular programs to collect information from the Internet according to certain strategies, organizes and processes the information, and provides retrieval services to users. The search engine retrieves relevant information based on keywords entered by the users, and presents the retrieved relevant information to the users as search results.

An important goal of developing the search engine technology is to minimize the number of human-machine operations of a user, and present the search results meeting the user's search intention to the user as far as possible. To achieve this goal, the search engine technology is constantly improving and developing.

Currently, there is a technology of presenting recommended query terms by the search engine, and main processes of this technology are as follows: while the user is entering a query term into a search box, the search engine finds out candidate query terms by text index based on the query term entered by the user (e.g., when the entered query term is "abc", the candidate query terms can be those hit "abc"), and filters the candidate query terms according to statistical data such as query times and/or click rate to obtain the query terms to be finally recommended to the user (also referred to as recommended query terms in the industry), and displays the recommended query terms to the user in real time to help the user filtering out the query term of interest, so that the time taken to enter the final query term can be saved for the user and search efficiency can be improved. FIG. 1 is a diagram schematically illustrating an interface of a search engine calculating and displaying recommended query terms automatically while a user is entering a query term in accordance with the prior art. As shown in FIG. 1, upon the user enters a query term "Faye Wong" 101 in the search box, the search engine performs a process of calculating recommendations immediately to get recommended query terms and displays a list 102 containing the recommended query terms. If the user is interested in a certain one of the recommended query terms, she/he may click on the certain recommended query term to complete a web search action.

Although the above method may save the time of the user for entering the query term, the web search results cannot meet the user's vertical search requirements well. The so-called vertical search refers to a specialized search technology which focuses on a specific industry, which is a subdivision and extension of the search engine. The vertical search integrates information of a specific type in a web database, extracts needed data by fields in a directed manner, and processes the extracted data so as to return it to the user in a certain form. The vertical search is a new search engine technology and is introduced in view of the huge information amount, inaccurate search results and insufficient search depth, etc., of the conventional search engine. The vertical search provides valuable information and related services by focusing on a specific field, a specific group of people or a specific requirement. The vertical search is characterized as "specialized, accurate and deep" and can reflect characteristics of a certain industry. The vertical search is more focused, more specific and deeper compared with a general search engine which provides disorderly mass information.

For example, a web search engine among the current search engines employ a universal, comprehensive search technology, and thus its search results obtained based on a query term may contain various sub-divisional information types of results, for example a search result page may contain search results of various types, such as video, image, news, music, etc. The vertical search, however, needs to distinguish among different types of information, and one type of vertical search engine searches only one type of contents. For example, a video vertical search engine is designed to search for results of video type; while a news vertical search engine is designed to search for results of news type. Currently most search engines are equipped with different vertical search engines (the vertical search engine is also known as the vertical search channel in the industry), each of which corresponds to a different vertical search type. FIG. 2 is a schematic diagram illustrating an interface of a home page of an existing search engine, including not only a web search engine 201 (i.e. a general search engine), but also vertical search engines such as an image search engine 202, a video search engine 203, a music search engine 204, a Q&A search engine 205 (i.e., the "Question" in FIG. 2), a news search engine 206, etc.

Although the prior art as shown in FIG. 1 may save the time for entering a query term by the user, it cannot meet the user's vertical search requirements well. For example, if the user clicks on the recommended query term "Faye Wong Legend" 103 or "Faye Wong Concert in Xi'an" 104 as shown in FIG. 1, corresponding web search results will be displayed directly. However, actual search intention of a certain recommended query term mostly corresponds to a certain type of vertical search. For example, the actual search intention of "Faye Wong Legend" 103 mostly corresponds to music contents, while the actual search intention of "Faye Wong Concert in Xi'an" 104 mostly corresponds to video contents. The prior art as shown in FIG. 1 cannot separately and intuitively list the highly relevant vertical search types, so if the user intends to search for contents of a certain vertical search type, she/he needs to click a second time on a link of the associated vertical search channel to find the contents of the certain vertical search type, such as contents of music or video type.

Therefore, the search engine of the prior art is inefficient in terms of vertical search, and is inconvenient for the user to find the vertical search results that are highly relevant to the query term from the search results, and makes the user can not recognize the vertical search types having the highest relevance to the respective recommended query terms. Meanwhile, in order to select the final vertical search results, the user often has to perform a second click on the link of the relevant vertical search channel, resulting in an increase in the member of human-machine interactions on the Internet machine side, and each human-machine interaction, in turn, sends operation request information, triggers a computation process and generates responding result information, and accordingly more resources on the machine side, including client resources, server resources, network bandwidth resource, etc., will be occupied.

SUMMARY

Therefore, the embodiments of the present disclosure mainly aim to provide a recommendation search method for a search engine, an apparatus and a computer-readable storage medium, so as to improve search efficiency of the vertical search.

One aspect of the present disclosure includes a recommendation search method for a search engine. The method includes recording a search log and a click log for query terms during search processes, and determining weights of tendencies of vertical searches for the query terms based on the recorded search log and click log. The method also includes, upon detecting a query term in a search box, determining recommended query terms relating to the query term in the search box, searching for the weights of tendencies of the vertical searches for each of the recommended query terms and determining a tendentious vertical search type for each of the recommended query terms based on the weights of tendencies of the vertical searches, and displaying each of the recommended query terms and links of the tendentious vertical search types for the recommended query terms. Further, the method includes, upon detecting a click on a link of one of the tendentious vertical search types corresponding to one of the recommended query terms, performing a search based on the one of the recommended query terms by using a vertical search engine corresponding to the one of the tendentious vertical search type, and displaying search results. The recording the search log for the query terms further includes: for each type of vertical search engine, when a search is performed with a vertical search engine of the type of vertical search engine, recording content of the query term being entered, the number of links being clicked among the search results, and the type of the vertical search engine. The recording the click log for the query terms further includes: recording the content of the query term being entered, links being clicked among the search results, and the vertical search types corresponding to the links being clicked, when a search is performed with a web search engine. The determining weights of tendencies of vertical searches for the query terms based on the recorded search log and click log further includes: determining weights of the tendencies of the vertical search types for each of the query terms, a weight of tendency of a certain vertical search type being determined by determining a first weight of the tendency of the certain vertical search type for a certain query term based on the search tog, determining a second weight of the tendency of the certain vertical search type for the certain query term based on the click log, and obtaining the weight of the tendency of the certain vertical search type for the certain query term by combining the first weight of the tendency and the second weight of the tendency.

Another aspect of the present disclosure includes recommendation search apparatus for a search engine. The recommendation search apparatus includes a logging module, a tendency analyzing module, a query term recommending module, a vertical search tendency recommending module, a recommendation display module, and a responding module. The logging module is for recording a search log and a click log for query terms during search processes. The tendency analyzing module is for determining weights of tendencies of vertical searches for the query terms based on the recorded search log and the click log. The query term recommending module is for detecting the query terms in a search box and, upon detecting a query term in the search box, determining recommended query terms for the query term. The vertical search tendency recommending module is for searching for the weights of tendencies of the vertical searches for each of the recommended query terms and determining a tendentious vertical search type for each of the recommended query terms based on the weights of tendencies of the vertical searches. The recommendation display module is for displaying each of the recommended query terms and links of the tendentious vertical search types for the recommended query terms. The responding module is for, upon detecting a click on a link of one of the tendentious vertical search types corresponding to one of the recommended query terms, performing a search based on the one of the recommended query term by using a vertical search engine which corresponds to the one of the tendentious vertical search type, and displaying search results. The recording the click log for the query terms further includes: recording the content of the query term being entered, links being clicked among the search results, and the vertical search types corresponding to the links being clicked, when a search is performed with a web search engine. The determining weights of tendencies of vertical searches for the query terms based on the recorded search log and click log further includes: determining weights of the tendencies of the vertical search types for each of the query terms, a weight of tendency of a certain vertical search type being determined by determining a first weight of the tendency of the certain vertical search type for a certain query term based on the search log, determining a second weight of the tendency of the certain vertical search type for the certain query term based on the click tog, and obtaining the weight of the tendency of the certain vertical search type for the certain query term by combining the first weight of the tendency and the second weight of the tendency.

Other aspects of the present disclosure can be understood by those skilled in the art in light of the description, the claims, and the drawings of the present disclosure.

DETAILED DESCRIPTION

The embodiments of the present disclosure are described in more detail below in conjunction with the accompanying drawings and the detailed embodiments.

Figure 1:
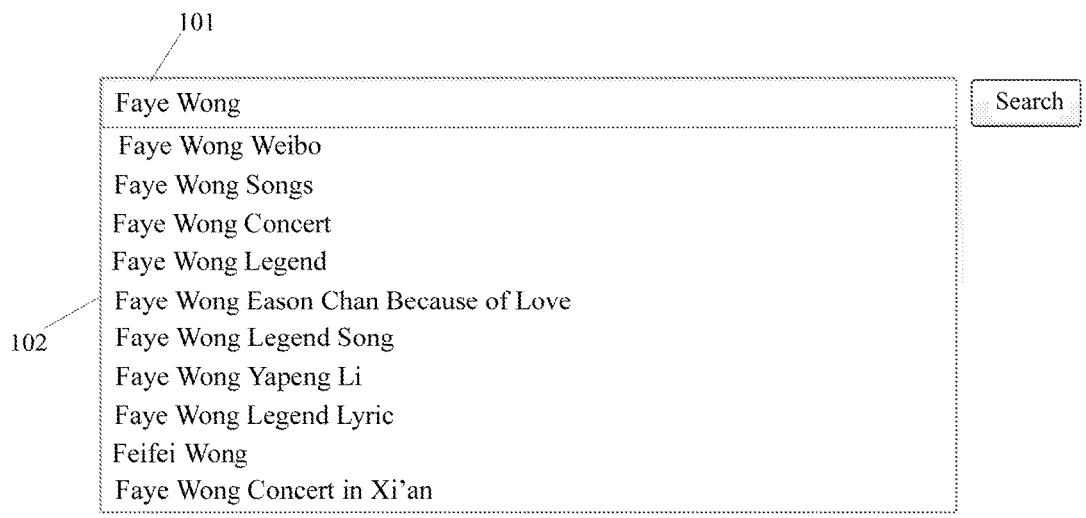
FIG. 1 is a diagram illustrating an interface of a search engine calculating and displaying recommended query terms automatically when a user is entering a query term in accordance with the prior art.
Figure 2:
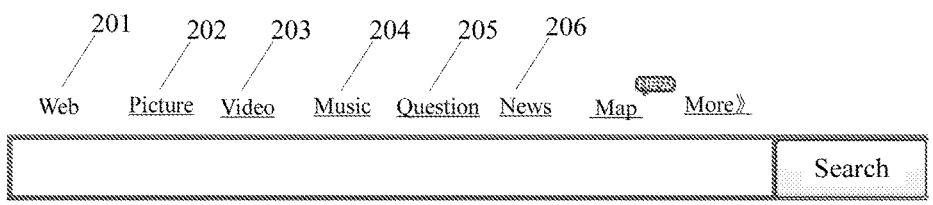
FIG. 2 is a schematic diagram illustrating a home page interface of an existing search engine.
Figure 3:
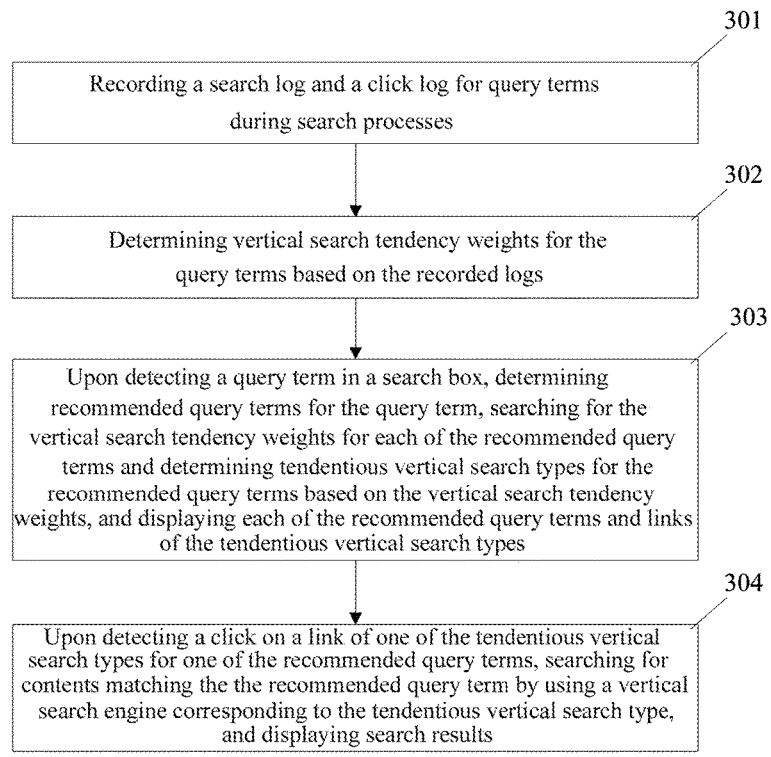
FIG. 3 is a process flowchart of a recommendation search method for a search engine in accordance with an embodiment of the present disclosure.

FIG. 3 is a process flowchart illustrating a recommendation search method for a search engine in accordance with an embodiment of the present disclosure. Referring to FIG. 3, the method mainly comprises the following processes performed by a electric device:

Step 301, a search log and a click log for query terms are recorded during search processes.

Step 302, weights of tendencies towards vertical searches (hereinafter, also referred to as vertical search tendency weights) for the query terms are determined based on the recorded logs.

Step 303, upon detecting a query term in a search box, recommended query terms relating to the query term are determined, vertical search tendency weights for each of the recommended query terms are searched for and a tendentious vertical search type for each of the recommended query terms is determined based on the tendency weights, and each of the recommended query terms and links of tendentious vertical search types for the recommended query terms are displayed.

step 304, upon detecting a click on a link of a tendentious vertical search type corresponding to a recommended query term, contents matching the recommended query term are searched for by using a vertical search engine which corresponds to the tendentious vertical search type, and search results are displayed.

According to the above method, tendencies towards vertical searches (hereinafter, also refers to as vertical search tendencies) are analyzed for query terms and links of tendentious vertical search types are added, thereby search users are provided with more intuitive and smarter vertical search links and are directed to get corresponding vertical search results directly. Thus the vertical search efficiency improved, and the second click of the user is eliminated, and accordingly the number of human-machine interactions is reduced, and the computing and bandwidth resources are saved; meanwhile the users are provided with better search results and thus may have better search experiences.

Figure 5:
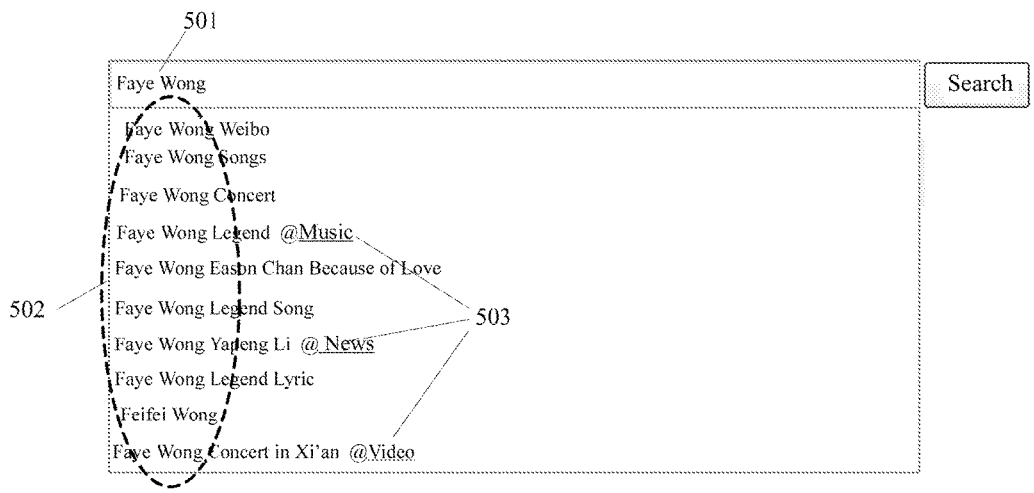
FIG. 5 is an interface diagram which illustrates that the recommendation search apparatus automatically analyzes and displays recommended search terms and associated tendentious vertical search types when a user enters a query term in a search box, in accordance with an embodiment of the present disclosure.
Figure 6:
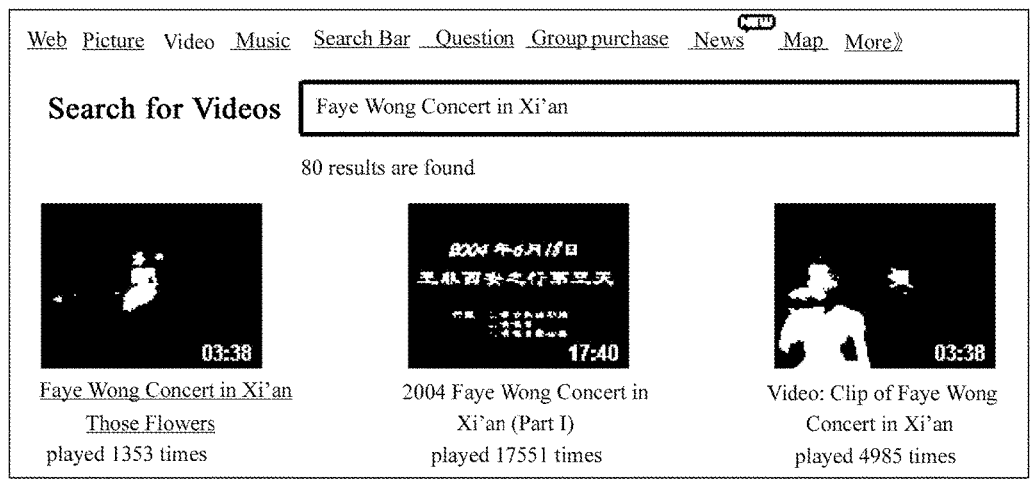
FIG. 6 is a diagram illustrating search results obtained after the user clicks on a link of a tendentious vertical search type corresponding to a recommended query term, in accordance with an embodiment of the present disclosure.

FIG. 5 is an interface diagram which illustrates that the commendation search method automatically analyzes and displays recommended search terms and associated tendentious vertical search types when a user enters a query term in a search box, in accordance with are embodiment of the present disclosure. As shown in FIG. 5, when the user enters a query term 501 in a search box of a search engine, the recommendation search method according to the embodiment of the present disclosure may automatically determine a set of recommended query terms 502 related to the query term entered by the user, and display the set of recommended query terms under the search box. The recommendation search apparatus may also provide links 503 of the tendentious vertical search types corresponding to the recommended query terms which respectively have clear tendencies and display the links 503 adjacent to their corresponding query terms, e.g., the links leading by a symbol "@" are displayed after their corresponding query terms as shown in FIG. 5. Thereafter, the user can click not only on one of the recommended query terms to perform a web search, but also on a link of the tendentious vertical search type leading by the symbol "@" to directly invoke a vertical search engine of the corresponding type to perform a search based on the corresponding recommended query term. For example, if the user clicks on the link of vertical search type "@video" which corresponds to the query term "Faye Wong Concert in Xi'an" as shown in FIG. 5, a vertical search engine of the video type will be invoked to perform a search based on the query term "Faye Wong Concert in Xi'an" and the video type search results as shown in FIG. 6 will be returned. The embodiment of the present disclosure may simplify the process in which the user looks for vertical resources of interest among a large amount of web search results and may provide the user with search results that better meet her/his requirements, and thus may improve the search efficiency.

FIGS. 5 and 6 illustrate exemplary interfaces for a computer search engine. However, in a wireless search scenario, the embodiments of the present disclosure may also be applied to a wireless search engine.

Next, the respective steps in accordance with the embodiment of the present disclosure are described in more detail.

The operation of recording a search log and a click log for the query terms at Step 301 is performed during search processes of users. The search processes here may also be referred to as relatively historical search processes, indicating the search processes occurred before providing the recommended query terms and their tendentious vertical search types in accordance with the embodiment of the present disclosure. Such a search process mainly comprises: the user submits a search request including a query term while she/he is using the search engine; a front end server receives the search request and then sends a request for retrieval to a background system of the search engine; the search engine returns to the user a list of search results after performing the retrieval. If the user finds some search results of interest, she/he may click on one or more of the links of the search results for review. During this search process, a logging module according to the embodiment of the present disclosure needs to record two kinds of logs: a search log and a click log.

The search log is mainly for various types of vertical search engines, and the specific method for recording the search log for the query terms is as follows: for each type of vertical search engine, whenever a search process is performed with a vertical search engine of the type, recording content of the query term being entered, the number of links being clicked among the search results, and the type of the vertical search engine.

The click log is mainly for a web search engine, and the specific method of recording the click log for query terms is mainly as follows: recording the content of the query term being entered, links being clicked among the search results, and the vertical search types corresponding to the links being clicked, whenever a search is performed with the web search engine.

After the search log and the click log are obtained, data of these two kinds of logs are input to a tendency analyzing module to be analyzed and calculated, and a set of recommended query terms with tendencies is obtained by using the method of Step 302.

The determination of the vertical search tendency weights for the query terms based on the recorded logs at Step 302 indicates determining, for each query term, weights of tendencies towards various types of vertical searches. The specific method of determining a weight of a tendency towards a certain vertical search type for a certain query term may comprise Steps 321-323, which will be described below by taking the weight of the tendency towards video type vertical search for the query term "Faye Wong Concert in Xi'an" as an example.

At Step 321, a first weight pw1 of the tendency towards the video type vertical search is determined for the query term "Faye Wong Concert in Xi'an" based on the search log, and the specific determining method may comprises: determining a search weight X/Y, wherein X indicates the number of searches based on the query term performed by the video type vertical search engine during a specified period of time, and Y indicates the number of all searches performed by the video type vertical search engine during the specified period of time; determining a click weight N/M, wherein N indicates the number of links that have been clicked among the search results for the query term "Faye Wong Concert in Xi'an" of the video type vertical search engine during the specified period of time, and M indicates the number of links that have been clicked among all search results in the video type vertical search engine page (i.e., the search results for all query terms in the video type vertical search engine) during the specified period of time; and obtaining the first weight pw1 of the tendency towards the video type vertical search for the query term "Faye Wong Concert in Xi'an" by performing a weighted calculation on the search weight and the click weight.

Specifically, the method of obtaining the first weight of the tendency towards the vertical search type for the query term by performing the weighted calculation on the search weight and the click weight may include calculating the first weight by using a method of weighted sum or a method of multiplication.

Calculating the first tendency weight pw1 by using the method of weighted sum may specifically include: obtaining the first tendency weight pw1 by utilizing an expression $(\alpha \times X/Y + \beta \times N/M)$, wherein $\alpha$ indicates a weight factor for the search, $\beta$ indicates a weight factor for the click, and the two factors can be preset.

Calculating the first tendency weight pw1 by using the method of multiplication may specifically include: calculating the expression of $(1+X/Y) \times (1+N/M)$ and normalizing an outcome of the expression to a float number in range of (0, 1), and the float number is the first tendency weight pw1.

Figure 7:
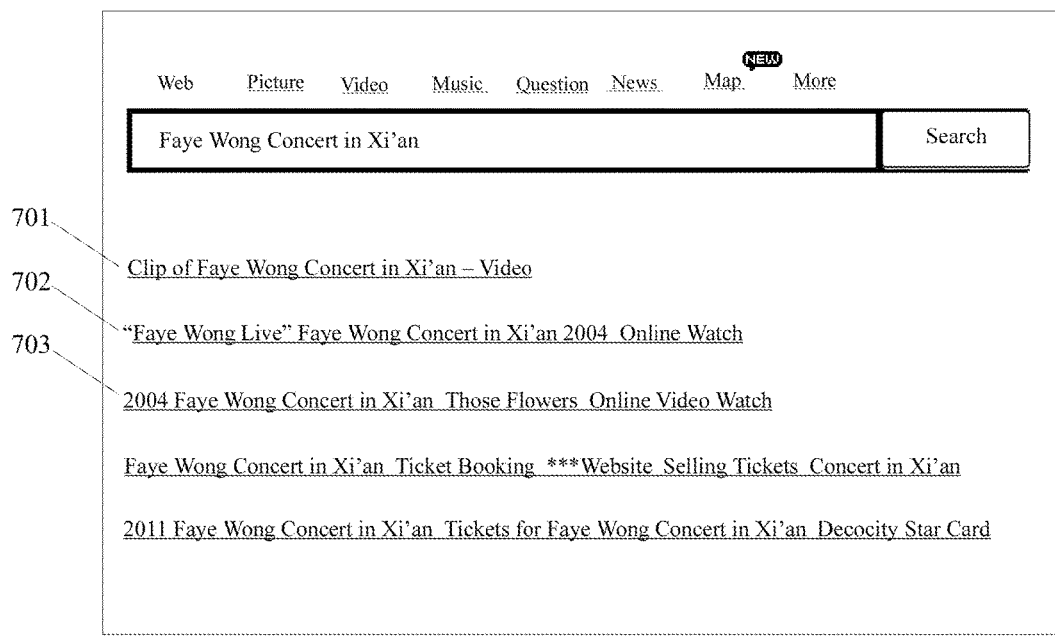
FIG. 7 is a schematic interface diagram illustrating video type search results displayed among web search results.

At Step 322, a second weight pw2 of the tendency towards the video type vertical search is determined for the query term "Faye Wong Concert Xi'an" based on the click log. The second tendency weight pw2 can be calculated by y/x, wherein, x indicates the number of searches based on the query term performed by the web search engine during a specified period of time (e.g., x searches based on the query term "Faye Wong Concert in Xi'an" have been performed by the user in the web search engine page during a time period t, and y indicates the number of links corresponding to the video type vertical search that have been clicked among web search results for the query term (e.g., y search results of the video type have been clicked by the user among the search results for the query term "Faye Wong Concert in Xi'an"). FIG. 7 is a schematic interface diagram illustrating video type search results displayed among web search results. For example, if the user clicks 3 video type search results 701, 702 and 703 as shown in FIG. 7, then y=3. The more video type search results the user clicks, the higher the second tendency weight pw2 is, which indicates that the user is interested in the video type search results corresponding to the query term "Faye Wong Concert in Xi'an", and thus the higher the tendency towards the video type vertical search for that query term is.

At Step 323, the first tendency weight pw1 and the second tendency weight pw2 are multiplied to obtain the weight of the tendency towards the vertical search type for the query term.

A set of recommended query terms with tendency weights, for example, as shown below in Table 1, can be finally obtained by performing analysis and calculation on the search log for various types of vertical search engines and the click log for the web search engine.

TABLE 1

| Query Term | Number of Searches qv | Number of Clicks clk | Tendency Weight |
|---|---|---|---|
| Faye Wong Weibo | 303 | 230 | 0 |
| Faye Wong Songs | 260 | 300 | Music 0.9 |
| Faye Wong Concert in Xi'an | 230 | 320 | Music 0.9, Video 0.8 |
| Faye Wong Legend | 200 | 260 | Music 0.9 |
| Faye Wong Yapeng Li | 131 | 100 | News 0.7 |
| Faye Wong Success Story | 110 | 80 | Question 0.5 |
| Faye Wong Latest News | 103 | 123 | News 0.6 |

In this embodiment, a threshold for the tendency weight can be set for filtering the tendency weights. If a weight of a tendency towards a certain type of vertical search is lower than the set threshold, then there is no such a tendency, the weight of the tendency towards the certain type of vertical search for the query term can be 0; and if the weights of the tendencies towards various types of vertical searches are all 0, the tendency weight for the query term can be set to 0, as shown in Table 1. If a weight of a tendency towards a certain type of vertical search for a certain query term is larger than the threshold, then it is indicated that the query term has the tendency towards the certain type of vertical search. The higher the tendency weight is, the higher the tendency is. An index can be established for the above-described query terms and uploaded into a memory by the recommendation search apparatus according to the embodiment of the present disclosure.

When it is detected that the user enters the query term "Faye Wong" in the search box, the query term recommending module according to the embodiment of the present disclosure may first find out candidate terms that hit the term "Faye Wong" by using text index, and then filter the candidate terms by using the number of searches "qv" and the number of clicks "clk" to determine the recommended query terms to be finally recommended to the user. The specific process of determining the recommended query terms associated with the query term "Faye Wong" can be found in the prior art, and thus the description thereof is omitted herein.

After a list of recommended query terms is determined, a vertical search tendency recommending module searches for the vertical search tendency weights for each of the recommended query terms, and determines tendentious vertical search types for respective recommended query terms based on the tendency weights.

Two methods can be used to determine the tendentious vertical search type for a recommended query terms based on the tendency weights. One method uses the filtering results of the tendency weights as described above: if the weights of the tendencies towards all types of vertical searches for a recommended query term are 0, it is determined that the recommended query term does not have a tendentious vertical search type; otherwise the vertical search type with a highest tendency weight for the recommended query term is determined as the tendentious vertical search type for the recommended query term. The other method does not adopt the filtering process of the tendency weights as described above, but directly determines the vertical search type with the highest tendency weight for the recommended query term as the tendentious vertical search type for the recommended query term.

After the recommended query terms and the associated tendentious vertical search types are determined, the recommended query terms and links of associated tendentious vertical search types are displayed as search results by a recommendation display module, as shown in FIG. 5. The search results in FIG. 5 are obtained by using the process of filtering the tendency weights, i.e., if the weights of the tendencies towards all vertical search types are 0 for a certain recommended query term (e.g., the recommended query term "Faye Wong Weibo" etc. in FIG. 5), it is determined that the recommended query term does not have a tendentious vertical search type, and thus no link of associated tendentious vertical search type is displayed.

If a response module detects that the user clicks on a link of a tendentious vertical search type corresponding to a certain recommended query term, the response module searches for contents matching the recommended query term by using a vertical search engine corresponding to the tendentious vertical search type, and then jumps to a page of the corresponding vertical search type to display the search results. For example, if the user clicks on the link of the vertical search type "@video" which corresponds to the query term "Faye Wong Concert in Xi'an" as shown in FIG. 5, a vertical search engine of the video type will be invoked to perform a search based on the query term "Faye Wong Concert in Xi'an" and the video type search results as shown in FIG. 6 will be returned.

If the response module detects that the user clicks on a recommended query term, instead of the link of the vertical search type behind the recommended query term, the response module searches for contents matching the recommended query term by using a web search engine and displays the web search results. The process of displaying the web search results is the same as that in the prior art, thus descriptions thereof are omitted.

According to the above method, vertical search tendencies are determined for the query terms and links of tendentious vertical search types are added, hereby search users are provided with more intuitive and smarter vertical search links and are directed to get corresponding vertical search results directly. Thus the efficiency of the vertical search is improved, and the second click of the user is eliminated, and accordingly the number of human-machine interactions is reduced, and the computing and bandwidth resources are saved; meanwhile the users are provided with better search results and thus may have better search experiences.

Figure 4:
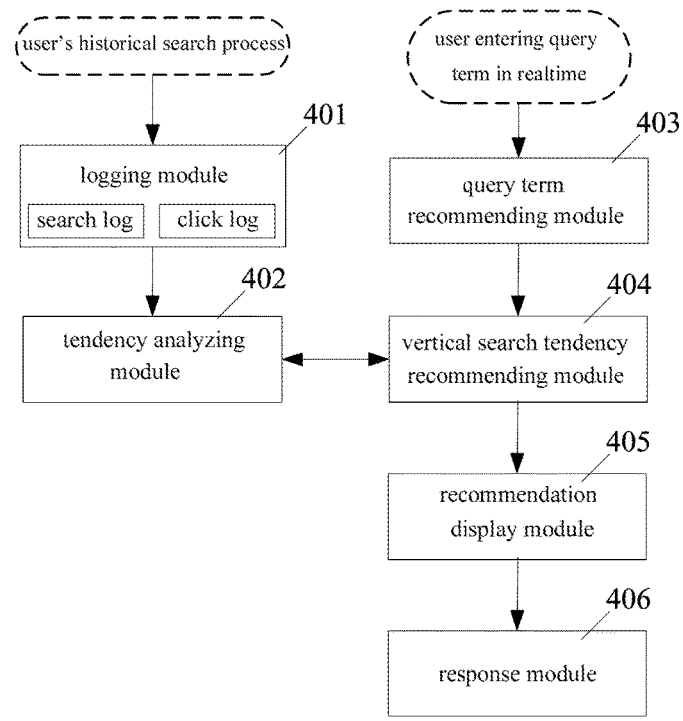
FIG. 4 is a schematic diagram illustrating constitution of a recommendation search method of a search engine in accordance with an embodiment of the present disclosure.

FIG. 4 is a schematic diagram illustrating constitution of a recommendation search apparatus for a search engine in accordance with an embodiment of the present disclosure. The recommendation search apparatus is used for performing the method according to the embodiment of the present disclosure, and mainly comprises:

A logging module 401, for recording, in a non-transitory memory, a search log and a click log for the query terms during historical search processes by the users. The historical search processes refer to all of the search processes that have been performed by the users during a specified period of time, wherein the "historical" is from the perspective of the query term recommending module 403, indicating the search processes occurred before the user enters the query term in the search box.

A tendency analyzing module 402 using a processor for determining vertical search tendency weights for respective query terms based on the recorded logs.

A query term recommending module 403 using a processor for detecting the query terms in a search box, and upon a query term is detected, determining recommended query terms associated with the query term.

A vertical search tendency recommending module 404 using a processor for searching for the vertical search tendency weights for each of the recommended query terms from the tendency analyzing module 402, and determining a tendentious vertical search type for each of the recommended query terms based on the tendency weights.

A recommendation display module 405, for displaying each of the recommended query terms and links of the tendentious vertical search types for the recommended query terms in a display device.

A response module 406, upon a click on a link of a tendentious vertical search type corresponding to a recommended query term is detected, searching for contents matching the recommended query term by using a vertical search engine which corresponds to the tendentious vertical search type, and displaying vertical search results in the display device.

Optionally, the logging module 401, when performing the step of recording the search log for the query terms, is specifically used for: for each type of vertical search engine, whenever a search process is performed with a vertical search engine of this type, recording content of the query term being entered, the number of links being clicked among the search results, and the type of the vertical search engine.

Optionally, the logging module 401, when performing the step of recoding the click log for the query terms, is specifically used for: recording the content of the query term being entered, links being clicked among the search results, and the vertical search types corresponding to the links being clicked, whenever a search is performed with a web search engine.

Optionally, the tendency analyzing module 402 is specifically used for: determining the weights of the tendencies towards various types of vertical searches for each of the query terms.

Optionally, the tendency analyzing module 402, when determining the weight of the tendency towards a certain type of vertical search for a certain query term, is specifically used for:

determining a first weight of the tendency towards the certain type of vertical search for the certain query term based on the search log, comprising: determining a search weight X/Y, wherein X indicates the number of searches based on the certain query term performed by the certain type of vertical search engine during a specified period of time, and Y indicates the number of all searches performed by e certain type of vertical search engine during the specified period of time; determining a click weight N/M, wherein N indicates the number of links that have been clicked among the search results for the certain query term of the certain type of vertical search engine during the specified period of time, and M indicates the number of links that have been clicked among all search results in a page of the certain type of vertical search engine during the specified period of time; and obtaining the first weight of the tendency towards the certain type of vertical search for the certain query term by performing a weighted calculation on the search weight and the click weight;

determining a second weight of the tendency towards the certain type of vertical search for the certain query term based on the click log, wherein the second tendency weight is y/x, in which x indicates the number of searches based on the certain query term performed by the web search engine during the specified period of time, and y indicates the number of links corresponding to the certain type of vertical search that have been clicked among web search results for the certain query term; multiplying the first tendency weight with the second tendency weight to obtain the weight of the tendency towards the certain type of vertical search for the certain query term.

Alternatively, the tendency analyzing module 402, when determining the weight of the tendency towards a certain type of vertical search for a certain query term, is specifically used for:

determining a first weight of the tendency towards the certain type of vertical search for the certain query term based on the search log, comprising: determining a search weight X/Y, wherein X indicates the number of searches based on the certain query term performed by the certain type of vertical search engine during a specified period of time, and Y indicates the number of all searches performed by the certain type of vertical search engine during the specified period of time; determining a click weight N/M, wherein N indicates the number of links that have been clicked among the search results for the certain query term of the certain type of vertical search engine during the specified period of time, and M indicates the number of links that have been clicked among all search results in a page of the certain type of vertical search engine during the specified period of time; and obtaining the first weight of the tendency by calculating the expression ($\alpha \times$X/Y+$\beta \times$N/M), wherein $\alpha$ indicates a weight coefficient for the search, and $\beta$ indicates a weight coefficient for the click;

determining a second weight of the tendency towards the certain type of vertical search for the certain query term based on the click log, wherein the second tendency weight is y/x, in which x indicates the number of searches based on the certain query term performed by the web search engine during the specified period of time, and y indicates the number of links corresponding to the certain type of vertical search that have been clicked among web search results for the certain query term; multiplying the first tendency weight with the second tendency weight to obtain the weight of the tendency towards the certain type of vertical search for the certain query term.

Alternatively, the tendency analyzing module 402, when determining the weight of the tendency towards a certain type of vertical search for a certain query term, is specifically used for:

determining a first weight of the tendency towards the certain type of vertical search for the certain query term based on the search log, comprising: determining a search weight X/Y, wherein X indicates the number of searches based on the certain query term performed by the certain type of vertical search engine during a specified period of time, and Y indicates the number of all searches performed by the certain type of vertical search engine during the specified period of time; determining a click weight N/M, wherein N indicates the number of links that have been clicked among the search results for the certain query term of the certain type of vertical search engine during the specified period of time, and NI indicates the number of links that have been clicked among all search results in a page of the certain type of vertical search engine during the specified period of time; and calculating the expression of (1+X/Y)$\times$(1+N/M) and normalizing an outcome of the expression to a float number in a range of (0,1), wherein the float number is the first weight of the tendency;

determining a second weight of the tendency towards the certain type of vertical search for the certain query term based on the click log, wherein the second tendency weight is y/x, in which x indicates the number of searches based on the certain query term performed by the web search engine during the specified period of time, and y indicates the number of links corresponding to the certain type of vertical search that have been clicked among web search results for the certain query term; multiplying the first tendency weight with the second tendency weight to obtain the weight of the tendency towards the certain type of vertical search for the certain query term.

Optionally, the tendency analyzing module 402 is further used for: after determining vertical search tendency weights for the query term based on the recorded logs, filtering the tendency weights, which specifically comprises: comparing each of the vertical search tendency weights for the query term with a set threshold; and if the weight of the tendency towards a certain type of vertical search is lower than the set threshold, setting the weight of the tendency towards the certain type of vertical search to 0. In this regard, the vertical search tendency recommending module 404 is specifically used for: searching for the vertical search tendency weights for each of the recommended query terms; and if the weights of the tendencies towards all types of vertical searches for the recommended query term are 0, determining that the recommended query term does not have a tendentious vertical search type; otherwise determining the vertical search type with the highest weight of tendency for the recommended query term as the tendentious vertical search type for the recommended query term.

Optionally, the vertical search tendency recommending module 404 is specifically used for: searching for the vertical search tendency weights for each of the recommended query terms; and determining the vertical search type with the highest weight of tendency for the recommended query term as the tendentious vertical search type for the recommended query term.

The apparatus according to this embodiment analyzes vertical searches tendencies for the query terms and adds the links of tendentious vertical search types, thereby search users are provided with more intuitive and smarter vertical search links and are directed to get corresponding vertical search results directly. Thus the efficiency of the vertical search is improved, and the second click of the user is eliminated, and accordingly the number of human-machine interactions is reduced, and the computing and bandwidth resources are saved; meanwhile the users are provided with better search results and thus may have better search experiences.

An embodiment of the present disclosure also provides a computer readable storage medium having a set of instructions recorded thereon, wherein the set of instructions, when being executed, cause any of the methods according to the above embodiments to be executed. The computer readable storage medium can be a floppy disc, a hard disc or an optical disc for a computer, and the computer can be a mobile phone, a personal computer, a server, or a network device, etc.

The various apparatus, search engine, computers, and/or functional modules may be implemented in any appropriate computing system. For example, such computing system may include a processor, a random access memory (RAM) unit, a read-only memory (ROM) unit, a database, a display, an input/output interface unit, a storage unit, and a communication interface, etc. Other components may be added and certain devices may be removed without departing from the principles of the disclosed embodiments.

Processor may include any appropriate type of graphic processing unit (GPU), general-purpose microprocessor, digital signal processor (DSP) or microcontroller, and application specific integrated circuit (ASIC), etc. Processor may execute sequences of computer program instructions to perform various processes associated with the computing system. The computer program instructions may be loaded into RAM for execution by processor from read-only memory.

The database may include any appropriate commercial or customized database to be used by computing system, and may also include query tools and other management software for managing database. The display may include any appropriate computer monitor, such as an LCD monitor. Further, the input/output interface may be provided for a user or users to input information into the computing system or for the user or users to receive information from the computing system. For example, the input/output interface may include any appropriate input device, such as a remote control, a keyboard, a mouse, a microphone, a video camera or web-cam, an electronic tablet, voice communication devices, or any other optical or wireless input devices. The input/output interface may include any appropriate output device, such as a speaker, or any other output devices.

The storage unit may include any appropriate storage device to store information used by the computing system, such as a hard disk, a flash disk, an optical disk, a CR-ROM drive, a DVD or other type of mass storage media, or a network storage. Further, the communication interface may provide communication connections such that the computing system may be accessed remotely and/or communicate with other systems through computer networks or other communication networks via various communication protocols, such as TCP/IP, hyper text transfer protocol (HTTP), etc.

It is understood that what described above are merely the preferred embodiments of the invention, and are not intended to limit the invention. Any changes, equivalent replacements, improvements, etc., within the spirits and principles of the invention should be included in the protection scope of the invention.

What is claimed is:

1. A recommendation search method for reducing human-machine interactions during a search, comprising:
   recording a search log and a click log for query terms during search processes performed with a search engine, the search engine including at least a vertical search engine and a web search engine;
   determining, by a processor of the search engine, weights of tendencies of vertical searches for the query terms based on the recorded search log and click log;
   upon detecting a query term in a search box, determining, by the processor, recommended query terms relating to the query term in the search box, searching for the weights of tendencies of the vertical searches for each of the recommended query terms and determining a tendentious vertical search type for each of the recommended query terms based on the weights of tendencies of the vertical searches, and displaying each of the recommended query terms and links of the tendentious vertical search types for the recommended query terms;
   upon detecting a click on a link of one of the tendentious vertical search types corresponding to one of the recommended query terms, performing, by the processor, a search based on the one of the recommended query terms by using a vertical search engine corresponding to the one of the tendentious vertical search type, and displaying search results,
   wherein:
   the recording the search log for the query terms further includes: for each type of vertical search engine, when a search is performed with a vertical search engine of the type of vertical search engine, recording, by the vertical search engine, content of the query term being entered, the number of links being clicked among the search results, and the type of the vertical search engine, and
   the recording the click log for the query terms further includes: recording, by the web search engine, the content of the query term being entered, links being clicked among the search results, and the vertical search types corresponding to the links being clicked, when a search is performed with the web search engine,
   the determining weights of tendencies of vertical searches for the query terms based on the recorded search log and click log further includes: determining weights of the tendencies of the vertical search types for each of the query terms, a weight of tendency of a certain vertical search type being determined by:
      determining a first weight of the tendency of the certain vertical search type for a certain query term based on the search log,
      determining a second weight of the tendency of the certain vertical search type for the certain query term based on the click log, and
      obtaining the weight of the tendency of the certain vertical search type for the certain query term by combining the first weight of the tendency and the second weight of the tendency.

2. The method of claim 1, wherein determining a first weight of the tendency of the certain vertical search type for a certain query term based on the search log further includes:
   determining a search weight X/Y, wherein X indicates a number of searches based on the certain query term performed by the certain type of vertical search engine during a specified period of time, and Y indicates a number of all searches performed by the certain type of vertical search engine during the specified period of time;
   determining a click weight N/M, wherein N indicates a number of clicked links among the search results for the certain query term of the certain type of vertical search engine during the specified period of time, and M indicates a number of links that have been clicked among all search results in a page of the certain type of vertical search engine during the specified period of time; and
   obtaining the first weight of the tendency of the certain type of vertical search for the certain query term by performing a weighted calculation on the search weight and the click weight.

3. The method of claim 2, wherein determining a second weight of the tendency of the certain vertical search type for the certain query term based on the click log further includes:

determining the second weight of the tendency as y/x, wherein x indicates a number of searches based on the certain query term performed by the web search engine during the specified period of time, and y indicates a number of links corresponding to the certain type of vertical search that have been clicked among web search results for the certain query term.

4. The method of claim 3, wherein obtaining the weight of the tendency of the certain vertical search type for the certain query term by combining the first weight of the tendency and the second weight of the tendency further includes:
multiplying the first weight of the tendency with the second weight of the tendency to obtain the weight of the tendency of the certain vertical search type for the certain query term.

5. The method of claim 2, wherein obtaining the first weight of the tendency of the certain type of vertical search for the certain query term by performing a weighted calculation on the search weight and the click weight comprises:
obtaining the first weight of the tendency by utilizing an expression $(\alpha \times X/Y + \beta \times N/M)$, wherein $\alpha$ indicates a weight coefficient for the search, and $\beta$ indicates a weight coefficient for the click.

6. The method of claim 2, wherein obtaining the first weight of the tendency towards the certain type of vertical search for the certain query term by performing a weighted calculation on the search weight and the click weight comprises:
utilizing an expression of $(1+X/Y) \times (1+N/M)$ and normalizing an outcome of the expression to a float number in a range of (0, 1), wherein the float number is the first weight of the tendency.

7. The method of claim 1, further comprising:
after determining weights of tendencies of vertical searches for the query terms based on the recorded search log and click log, filtering the weights of the tendencies by:
comparing each of the weights of the tendencies of the vertical searches for the query terms with a set threshold; and
when the weight of the tendency of a certain type of vertical search is lower than the threshold, setting the weight of the tendency of the certain type of vertical search to 0,
wherein determining the tendentious vertical search type for each of the recommended query terms based on the weights of tendencies comprises:
when weights of the tendencies of all types of vertical searches for the recommended query term are 0, determining that the recommended query term does not have a tendentious vertical search type;
when weights of the tendencies of all types of vertical searches for the recommended query term are not 0, determining the vertical search type with a highest weight of tendency for the recommended query term as the tendentious vertical search type for the recommended query term.

8. The method of claim 1, wherein determining the tendentious vertical search type for each of the recommended query terms based on the weights of tendencies comprises:
determining the vertical search type with a highest weight of tendency for the recommended query term as the tendentious vertical search type for the recommended query term.

9. The method of claim 1, further comprising:
upon detecting a certain one of the recommended query terms is clicked, searching for contents matching the recommended query term by using a web search engine and displaying the search results.

10. A recommendation search apparatus for reducing human-machine interactions during a search, comprising:
a memory;
a processor coupled to the memory; and
program modules stored in the r memory to be executed by the processor, the program modules comprising:
a logging module for recording a search log and a click log for query terms during search processes performed with a search engine, the search engine including at least a vertical search engine and a web search engine;
a tendency analyzing module for determining weights of tendencies of vertical searches for the query terms based on the recorded search log and the click log;
a query term recommending module for detecting the query terms in a search box and, upon detecting a query term in the search box, determining recommended query terms for the query term;
a vertical search tendency recommending module for searching for the weights of tendencies of the vertical searches for each of the recommended query terms and determining a tendentious vertical search type for each of the recommended query terms based on the weights of tendencies of the vertical searches;
a recommendation display module for displaying each of the recommended query terms and links of the tendentious vertical search types for the recommended query terms; and
a responding module for, upon detecting a click on a link of one of the tendentious vertical search types corresponding to one of the recommended query terms, performing a search based on the one of the recommended query term by using a vertical search engine which corresponds to the one of the tendentious vertical search type, and displaying search results,
wherein:
the recording the search log for the query terms further includes: for each type of vertical search engine, when a search is performed with a vertical search engine of the type of vertical search engine, recording, by the vertical search engine, content of the query term being entered, the number of links being clicked among the search results, and the type of the vertical search engine, and
the recording the click log for the query terms further includes: recording, by the web search engine, the content of the query term being entered, links being clicked among the search results, and the vertical search types corresponding to the links being clicked, when a search is performed with the web search engine,
the determining weights of tendencies of vertical searches for the query terms based on the recorded search log and click log further includes: determining weights of the tendencies of the vertical search types for each of the query terms, a weight of tendency of a certain vertical search type being determined by:
determining a first weight of h tendency of the certain vertical search type for a certain query term based on the search log, determining a second weight of the tendency of the certain vertical search type for the certain query term based on the click log, and obtaining the weight of the tendency of the certain vertical search type for the certain query term by combining the first weight of the tendency and the second weight of the tendency.

11. The apparatus of claim 10, wherein determining a first weight of the tendency of the certain vertical search type for a certain query term based on the search log further includes:

determining a search weight X/Y, wherein X indicates a number of searches based on the certain query term performed by the certain type of vertical search engine during a specified period of time, and Y indicates a number of all searches performed by the certain type of vertical search engine during the specified period of time;

determining a click weight NM, wherein N indicates a number of clicked links among the search results for the certain query term of the certain type of vertical search engine during the specified period of time, and M indicates a number of links that have been clicked among all search results in a page of the certain type of vertical search engine during the specified period of time; and obtaining the first weight of the tendency of the certain type of vertical search for the certain query term by performing a weighted calculation on the search weight and the click weight.

12. The apparatus of claim 11, wherein determining a second weight of the tendency of the certain vertical search type for the certain query term based on the click log further includes:

determining the second weight of the tendency as y/x, wherein x indicates a number of searches based on the certain query term performed by the web search engine during the specified period of time, and y indicates a number of links corresponding to the certain type of vertical search that have been clicked among web search results for the certain query term.

13. The apparatus of claim 12, wherein obtaining the weight of the tendency of the certain vertical search type for the certain query term by combining the first weight of the tendency and the second weight of the tendency further includes:

multiplying the first weight of the tendency with the second weight of the tendency to obtain the weight of the tendency of the certain vertical search type for the certain query term.

14. The apparatus of claim 11, wherein obtaining the first weight of the tendency of the certain type of vertical search for the certain query term by performing a weighted calculation on the search weight and the click weight comprises:

obtaining the first weight of the tendency by utilizing an expression $(\alpha \times X/Y + \beta \times N/M)$, wherein $\alpha$ indicates a weight coefficient for the search, and $\beta$ indicates a weight coefficient for the click.

15. The apparatus of claim 11, wherein obtaining the first weight of the tendency towards the certain type of vertical search for the certain query term by performing a weighted calculation on the search weight and the click weight comprises:

utilizing an expression of $(1+X/Y) \times (1+N/M)$ and normalizing an outcome of the expression to a float number in a range of (0, 1), wherein the float number is the first weight of the tendency.

16. The apparatus of claim 10, wherein the vertical search tendency recommending module is further configured for:

after determining weights of tendencies of vertical searches for the query terms based on the recorded search log and click log, filtering the weights of the tendencies by:

comparing each of the weights of the tendencies of the vertical searches for the query terms with a set threshold; and when the weight of the tendency of a certain type of vertical search is lower than the threshold, setting the weight of the tendency of the certain type of vertical search to 0, wherein determining the tendentious vertical search type for each of the recommended query terms based on the weights of tendencies comprises:

when weights of the tendencies of all types of vertical searches for the recommended query term are 0, determining that the recommended query term does not have a tendentious vertical search type;

when weights of the tendencies of all types of vertical searches for the recommended query term are not 0, determining the vertical search type with a highest weight of tendency for the recommended query term as the tendentious vertical search type for the recommended query term.

17. The apparatus of claim 10, wherein determining the tendentious vertical search type for each of the recommended query terms based on the weights of tendencies comprises:

determining; the vertical search type with a highest weight of tendency for the recommended query term as the tendentious vertical search type for the recommended query term.

* * * * *